July 6, 1965 J. R. FRIES ETAL 3,192,675
FEED INDICATOR FOR MACHINE TOOLS
Filed July 16, 1962 5 Sheets-Sheet 4
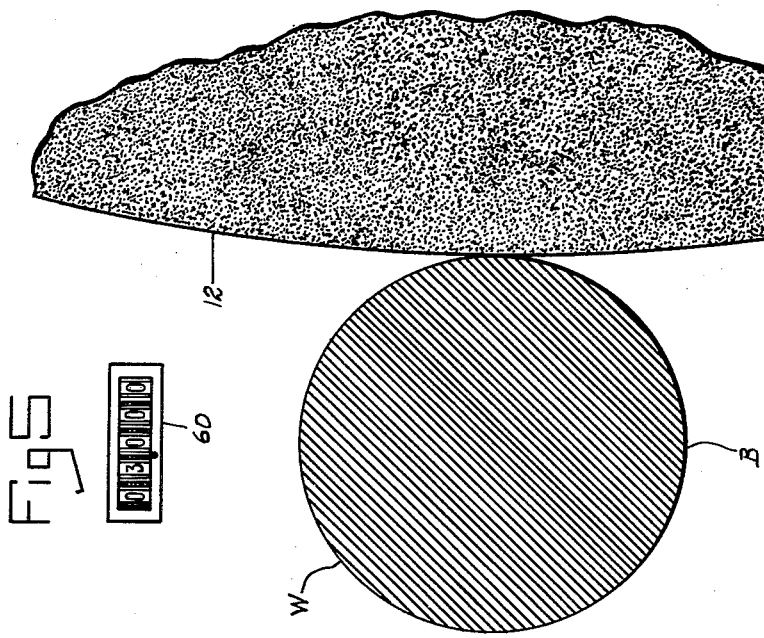
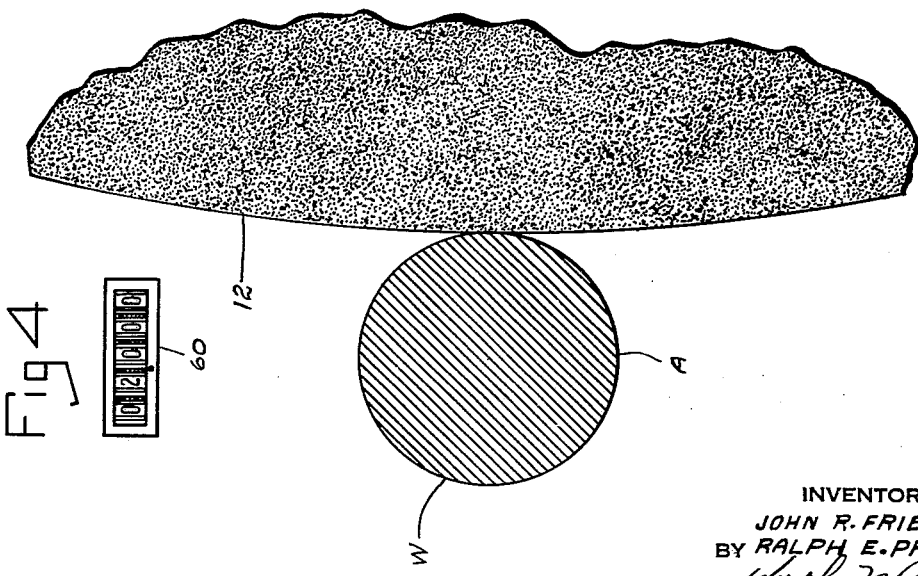
INVENTORS
JOHN R. FRIES
BY RALPH E. PRICE
ATTORNEY July 6, 1965   J. R. FRIES ETAL   3,192,675
FEED INDICATOR FOR MACHINE TOOLS
Filed July 16, 1962   5 Sheets-Sheet 5
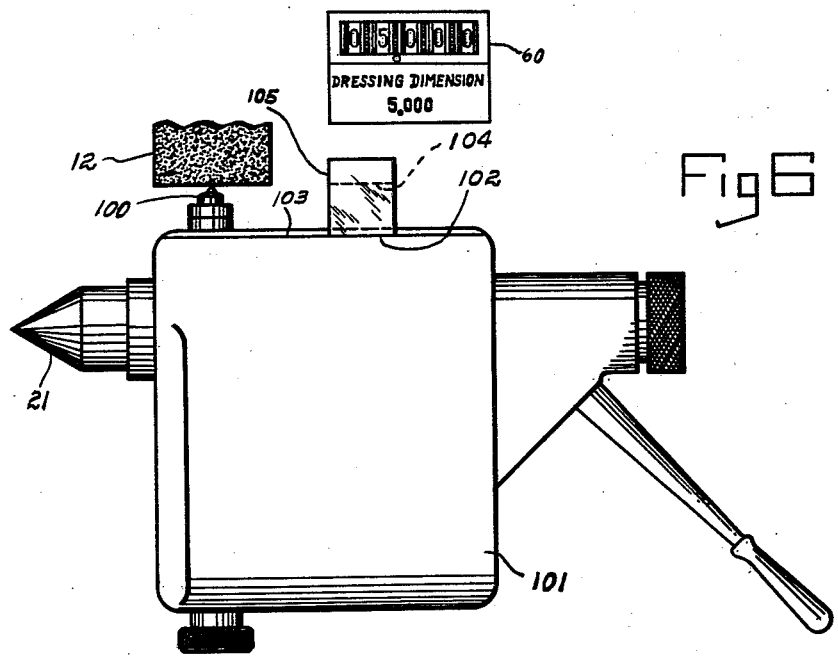
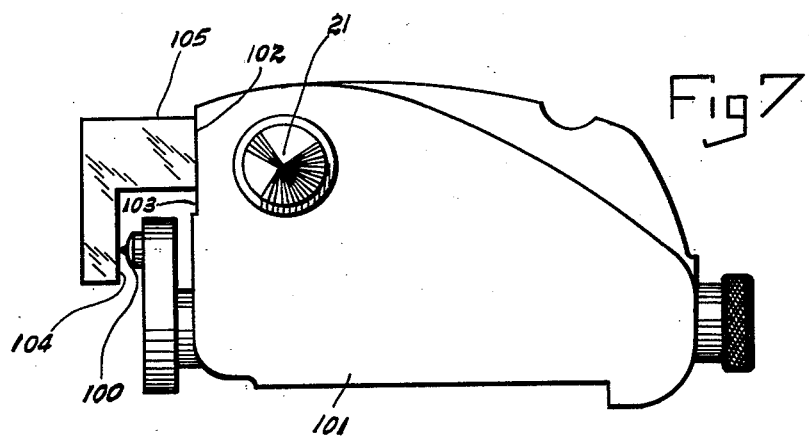
INVENTORS
JOHN R. FRIES
BY RALPH E. PRICE
ATTORNEY

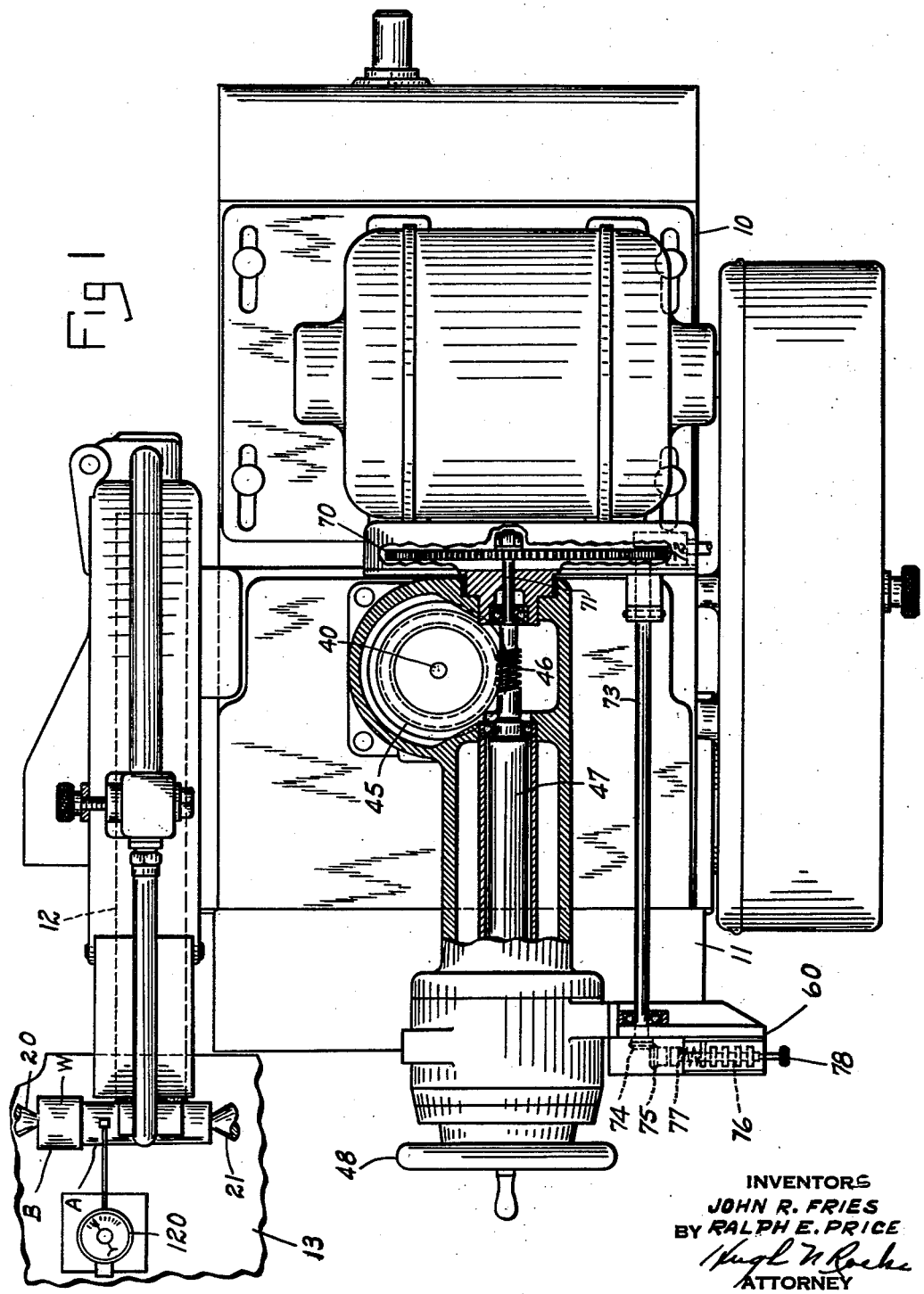

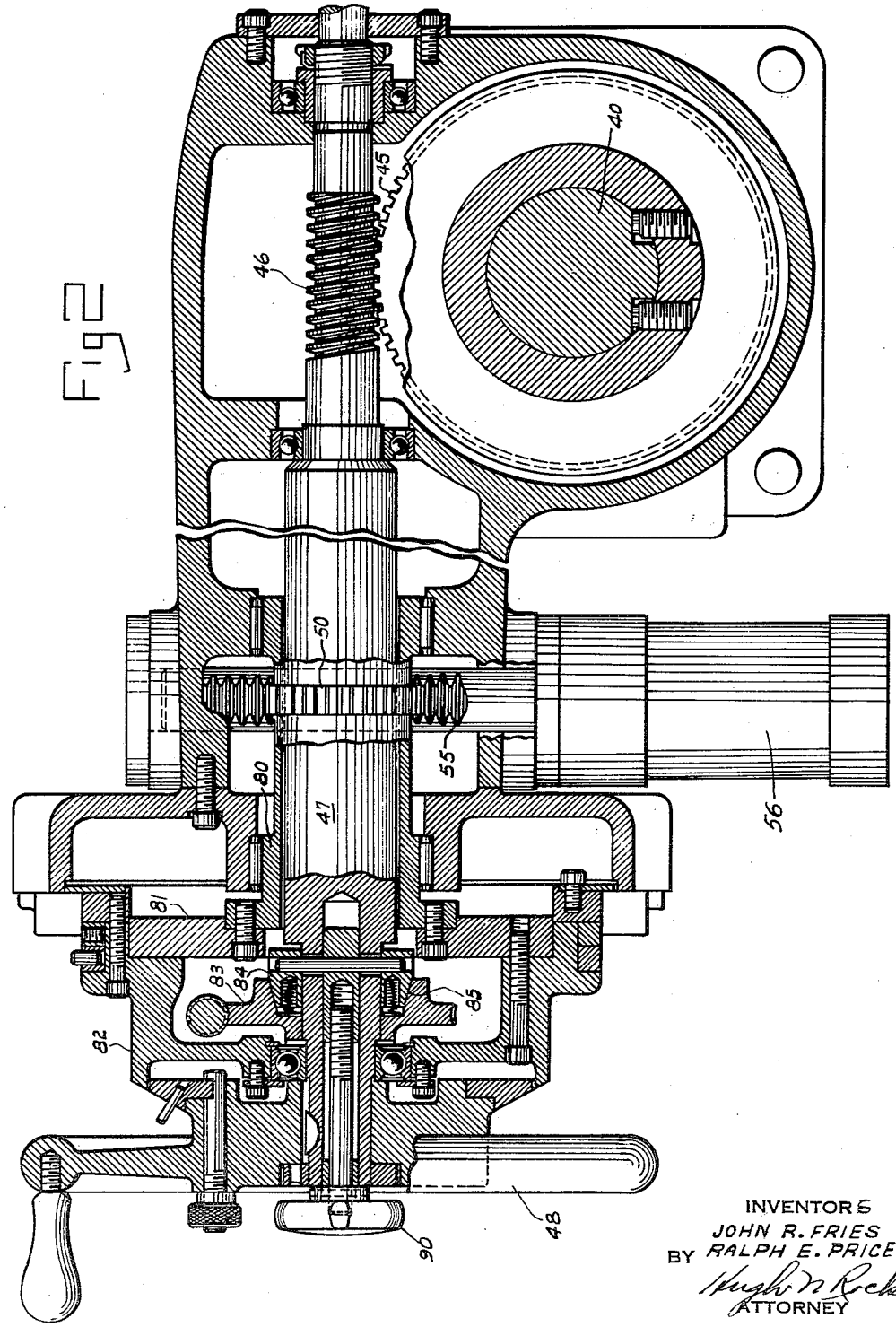

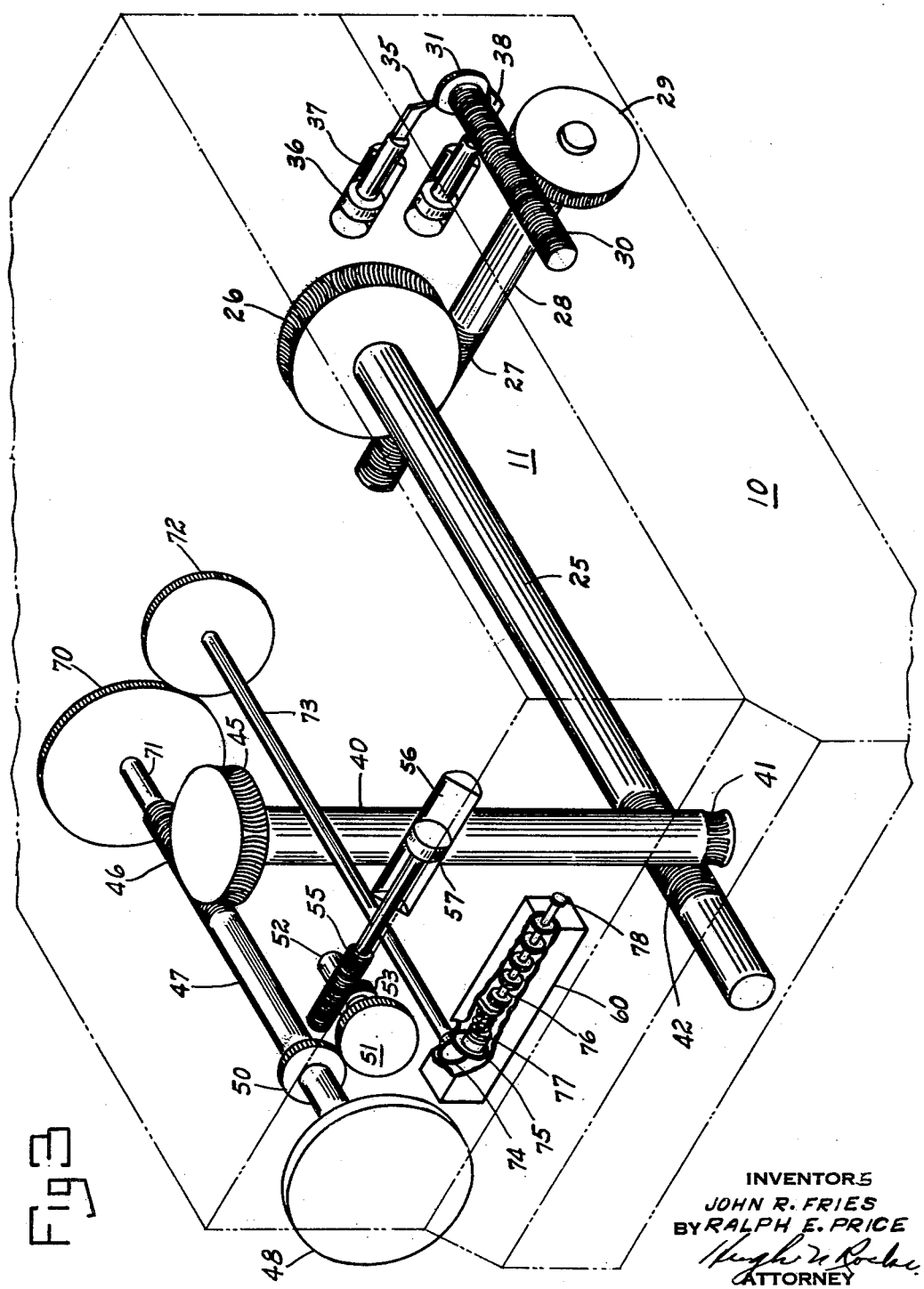

United States Patent Office 3,192,675
Patented July 6, 1965

3,192,675
FEED INDICATOR FOR MACHINE TOOLS
John R. Fries and Ralph E. Price, Waynesboro, Pa.,
assignors to Landis Tool Company, Waynesboro, Pa.
Filed July 16, 1962, Ser. No. 211,937
11 Claims. (Cl. 51—165)

This application is a continuation-in-part of applicants' application, Serial No. 845,440, filed October 9, 1959, now abandoned.

This invention relates to feed mechanisms for grinding machines, particularly to feed mechanisms which have manual actuating means and power actuating means which function independently to advance a grinding wheel relative to a workpiece.

In the operation of a grinding machine, particularly in the grinding of small dots of workpieces of different sizes, it is desirable to be able to make a rapid change from one set-up of a machine to another for grinding workpieces of widely varying dimensions.

The problem is substantially the same whether the grinding machine is grinding cylindrical workpieces or a surface grinder for grinding linear surfaces. In both types of machines, the problem of changing set-up is complicated by the fact that the operative face of the grinding wheel is continuously receding because of wear and dressing.

At the present time, the general practice in changing a machine set-up from one size of workpiece to another is for the operator to count the number of turns of the hand wheel necessary to reposition the grinding wheel for the new dimension. When the first piece has been ground, the operator must advance the grinding wheel cautiously by hand until it engages the workpiece. The feed mechanism is then set to return to the same position repeatedly at high speed for positioning, after which it is advanced more slowly for grinding until stopped and reset by a size control device when the work has been ground to a predetermined dimension. Such a size control device is shown in Patent 3,039,240, granted June 19, 1962 and Patent 3,046,706, granted July 31, 1962.

It is, therefore, an object of the invention to provide means to eliminate the need to count the turns of the hand wheel when changing the setting of the feed mechanism for a new dimension.

In the case of a cylindrical grinding machine, this dimension is measured from the axis of rotation of the work. The distance between the face of the wheel and the axis of the work is the radius of the workpiece. The dimension in which the operator is interested is the diameter which is double the distance between the axis of rotation and the operative surface of the grinding wheel.

In the case of a surface grinder, the dimension is measured from the surface on which the workpiece rests. The size of the work is the distance between the supporting surface and the operative surface of the grinding wheel.

In the case of a grinding machine of the type known as disc grinders, where a workpiece is ground between opposed abrasive discs, the dimension of the work is measured from its center line. The distance from the operative surface of each disc and the center of the work is half the thickness or length of the workpiece.

In each case, it is desirable to set up the machine in terms of the finished dimension of the workpiece.

It is, therefore, an object of the present invention to provide means for indicating the setting of a grinding wheel feed mechanism in terms of the thickness or diameter of the workpiece to be ground.

Another object is to provide an indicating device having a fixed driving connection with the manual means for actuating the feed mechanism.

Another object is to provide a wheel dressing device in a predetermined position relative to the line or surface from which the dimension of the workpiece is determined.

Another object is to provide means whereby the indicator when used to set the feed mechanism will show the position of the operative face of the grinding wheel in terms of the dimension to be ground regardless of change in diameter of the grinding wheel due to wear or dressing.

For the purpose of illustration, a cylindrical-type grinder is disclosed in the drawings.

FIG. 1 is a partial plan view, partly in section, of a grinding machine showing the relation between the manual feeding means and an indicating device.

FIG. 2 is a sectional plan view of the feed hand wheel mechanism including the power means for driving said mechanism and means for disconnecting said power means from said manual means.

FIG. 3 is a diagrammatic illustration of all the elements of a feed mechanism including the indicating device.

FIG. 4 shows a grinding wheel in engagement with a 2" workpiece and the corresponding indicator reading.

FIG. 5 shows a grinding wheel in engagement with a 3" workpiece and the corresponding indicator reading.

FIG. 6 shows a grinding wheel in wheel dressing position and the corresponding indicator.

FIG. 7 is a left hand view of the footstock showing the gauge for setting the dresser.

Numeral 10 in FIG. 3 indicates an outline representing the machine base. Wheel support 11 is slidably mounted on base 10. Grinding wheel 12 is rotatably supported on wheel support 11 for movement toward and from a workpiece W supported between work centers 20 and 21 on work carriage 13. Workpiece W has a large diameter B and a smaller diameter A.

The means for advancing and retracting grinding wheel 12 relative to workpiece W consists of feed screw 25 rotatably and slidably mounted in base 10. Worm wheel 26 on one end of feed screw 25 is in operative engagement with worm gear 27 formed on shaft 28. Worm wheel 29 on shaft 28 engages worm gear 30 having a ratchet wheel 31 at one end. Pawl 35 actuated by piston 36 in cylinder 37 provides intermittent rotation of ratchet wheel 31 and feed screw 25 through the previously described connections.

Ratchet wheel 31 and feed screw 25 may be rotated in the opposite direction by pawl 38 for resetting the increment feed. Pawl 38 may be actuated by a piston and cylinder identical with those for actuating pawl 35, to reset ratchet wheel 31 and wheel support 11 by a fixed predetermined amount as described in Patent 3,046,706 granted July 31, 1962 and Patent 3,047,988, granted August 7, 1962.

As shown in Patent 2,657,505, granted November 3, 1953, feed screw 25 can be moved rapidly endwise for a rapid positioning movement. However, this invention can be used with or without such a positioning movement.

The means for advancing and retracting wheel support 11 manually consists of a vertical shaft 40 rotatably mounted in wheel support 11 and having teeth 41 formed at one end thereof for operative engagement with thread 42 on feed screw 25. At the other end of vertical shaft 40 is a worm wheel 45 in operative engagement with worm gear 46 on hand wheel shaft 47. Hand wheel 48 provides means for manually rotating shaft 47. Shaft 47 may also be rotated by power.

Means for effecting such a power operation for shaft 47 consists of pinion 50 in operative engagement with gear 51 on shaft 52. Pinion or worm wheel 53 on shaft 52 is in operative engagement with a rack or screw 55. Screw 55 can be shifted axially by a suitable hydraulic motor 56 similar to that shown in Patent 3,047,988.

Indicator 60 in the form of a mechanical counting device is mounted adjacent hand wheel 48 so that it can be observed by the operator as he turns hand wheel 48. Indicator 60 does not function either as a conventional indicator or as a counter, but rather as a dimension registering means connected to a feed mechanism to register or display numerically in inches and decimals of an inch, a diameter or other dimension of a workpiece. Indicator 60 or its equivalent may be actuated in the same manner by the manual feeding means forming part of feed mechanisms other than that disclosed herein.

Means for actuating indicator 60 consists of gear 70 on an extended portion 71 of shaft 47. Gear 70 is in operative engagement with a smaller gear 72 on shaft 73. Bevel gear 74 on the end of shaft 73 engages a bevel gear 75 on the end of indicator shaft 76. Such indicators generally have provision for manually setting the dial elements independently of the driving connection, in this case, the manual feed mechanism. For the purpose of illustration, indicator 60 may be provided with a clutch 77 for disconnecting shaft 76 from the bevel gear 75 and shaft 73 which connects indicator 60 with the manual feed mechanism. Button 78 may be used to disengage clutch 77 so that the indicator 60 may be turned to read the five inches or any other known dimension for which the feed has been set. Thereafter, button 78 is released to engage clutch 77, and the connection between indicator 60 and hand wheel 48 remains unchanged for the life of the grinding wheel.

In FIG. 2, rack or screw 55 is shown as being directly connected to pinion 50. Pinion 50 is also shown as being mounted on sleeve 80 which is connected to members 81 and 82 and clutch member 83. Sleeve 80 may be engaged and disengaged from hand wheel 48 by means of a clutch consisting of member 84 pinned to shaft 47 and co-operating with co-acting surface 85 in member 83. Said clutch is actuated by knob 90.

*Operation*

When a new grinding wheel is placed on the machine, it must be subjected to a truing operation to correct any out of round condition of the wheel. The truing tool 100 is mounted in a conventional position on the back of footstock 101 facing the grinding wheel. The transverse position of truing tool 100 relative to the axis of the work is determined by gauge 105 having one surface 102 for engaging a locating surface 103 on foot stock 101. Another surface 104 on gauge 105 serves to engage truing tool 100. The distance from the work axis to the truing tool represents the truing dimension of grinding wheel 12.

Grinding wheel 12 is advanced to front position by means of a rapid feed motor (not shown) of the type commonly used to effect axial positioning movement of feed screw 25 and wheel support 11. With or without a rapid feed motor, grinding wheel 12 may also be advanced for a grinding operation by rack 55 operating through pinion 50, sleeve 80, clutch members 83–84, hand wheel 48, hand wheel shaft 47, worm gear 46 and worm wheel 45 on shaft 40 to advance shaft 40 and wheel support 11 relative to feed screw 25 by engagement of worm wheel teeth 41 on shaft 40 with screw thread 42 on feed screw 25. The end of this movement is indicated when rack 55 reaches the end of its stroke and hand wheel 48 stops rotating. Then wheel support 11 is in its most advanced position for the particular setting of hand wheel 48 and the associated feed mechanism.

Pinion 50 on sleeve 80 is then dis-connected from hand wheel shaft 47 by means of clutch members 83–84 provided for this purpose. Grinding wheel 12 is then advanced by means of hand wheel 48 and associated parts to dressing position in line with truing tool 100.

After dressing and before retracting grinding wheel 12, pinion 50 and sleeve 80 are again connected to hand wheel shaft 47 by re-egaging clutch members 83–84. In this position, grinding wheel 12 would grind a workpiece of such a diameter that the surface of the work would be in line with truing tool 100.

Assuming the diameter of five inches for such a workpiece, the dimension five inches is also the dressing dimension of grinding wheel 12. Grinding wheel 12 is then returned to back position by rack 55 and motor 56.

In this position, the dimension registering means or indicator 60 is set to read five inches and is inscribed to the effect that the five inch setting represents the dressing dimension. Thereafter, for the life of the wheel or as long as that wheel is on the machine, for every dressing operation or change in work diameter, the wheel must be retracted and the feed mechanism adjusted by the hand wheel until the indicator reads the dressing dimension or work diameter. The wheel is then advanced by power to the dressing or grinding position. As the grinding wheel becomes smaller in diameter, its position relative to a given diameter of the workpiece remains unchanged since in order to grind the workpiece to final size, the grinding wheel is advanced by rotating feed screw 25 by means such as ratchet 31 and pawl 35, without rotating hand wheel 48 or changing the reading of indicator 60.

To set the machine for grinding a certain diameter, pinion 50 and rack 55 are retracted and disconnected from hand wheel 48 by means of clutch members 83–84. Hand wheel 48 is turned until indicator 60 reads the desired diameter minus .001″ or some other suitable dimension. Pinion 50 and rack 55 are then connected to hand wheel 48 to advance grinding wheel 12 and grind a workpiece. When rack 55 reaches the end of its stroke, the workpiece is still oversize by the .001″ mentioned above. Final advance of the wheel is effected by means of any suitable fine feed mechanism such as that disclosed in FIG. 3 consisting of pawl 35, ratchet 31 and suitable gearing for rotating feed screw 25. When the desired size is reached, as determined by a suitable size indicator or gaging device 120, the grinding operation is stopped. For high precision grinding, hand wheel 48 and indicator 60 are used only to set grinding wheel 12 in an approximate position to find a selected diameter and the final .001″ or other dimension is ground as described above. When work tolerance is within the limits of accuracy of the indicator, final size may be reached when rack 55 reaches the end of its stroke.

Where final size is reached by rotating feed screw 25 until gaging device 120 indicates the desired size, compensation for wheel wear is automatically accomplished without changing the setting of indicator 60. Where final size is reached when rack 55 reaches the end of its stroke, wheel wear and other variables may be compensated for by periodical adjustment of feed screw 25 without changing the setting of indicator 60.

If it is desired to set the grinding wheel to grind a two inch workpiece, rack 55 is first retracted to back position, and hand wheel 48 is disconnected from rack 55 and pinion 50, and turned until indicator 60 reads two inches less .001″ or other amount for final feed. Rack 55 and pinion 50 are then connected to hand wheel shaft 47 in preparation for grinding the new diameter.

In order to change the wheel setting from one diameter to another, it is necessary to retract the hand wheel mechanism by rack 55, dis-engage pinion 50 from hand wheel 48 by means of clutch member 84 so that hand wheel 48 and shaft 47 can be rotated through a distance which would be beyond the range of endwise movement of rack 55. The operation of clutch member 84 to dis-engage the power feed from the manual feed does not change the relation between the manual feed and indicator 60.

The rough grinding operation is effected by power rotation of hand wheel 48 which drives vertical shaft 40 so that teeth 41 and thread 42 serve as a pinion and rack. Thus, vertical shaft 40 along with wheel support 11 is advanced or retracted through a predetermined distance relative to feed screw 25.

Fine feed is effected by incremental rotation of feed screw 25 by ratchet wheel 31 and pawl 35. When so rotated, vertical shaft 40 through the engagement of teeth 41 with thread 42, advances and retracts wheel support 11 relative to feed screw 25 without rotation of said feed screw. The range of the feeding movement by pawl 35 and ratchet wheel 31 and associated gearing is limited only by the length of the thread 42 of feed screw 25.

When it becomes necessary to perform a dressing operation on grinding wheel 12, rack 55 is actuated to retract grinding wheel 12. In retracted position, clutch member 84 is disengaged to disconnect the hand wheel mechanism from rack 55. Hand wheel 48 is then actuated until indicator 60 shows the dressing dimension, five inches. Rack 55 and the hand wheel mechanism are again connected and rack 55 advances grinding wheel 12 to dressing position. In this position, the advance of grinding wheel 12 for dressing is accomplished by means of ratchet 31 and pawl 35 through feed screw 25. Thus, the setting of indicator 60 on the hand wheel mechanism is not changed as the grinding wheel 12 is advanced for dressing. This advance of grinding wheel 12 by feed screw 25 and the pawl and ratchet mechanism serves to compensate for the change in wheel diameter and other variables without changing the relation between the hand wheel mechanism and indicator 60.

Rack 55 then returns the hand wheel mechanism and grinding wheel 12 to retracted position. Rack 55 is again disconnected from the hand wheel mechanism which is turned to change the feed mechanism from the dressing dimension to the diameter of the workpiece which is being ground. Rack 55 is again connected to the hand wheel mechanism and advances grinding wheel 12 to grind the workpiece to the diameter shown on indicator 60 in the retracted position of rack 55.

We claim:

1. In a grinding machine, a grinding wheel support movable toward and from a workpiece, a grinding wheel mounted on said wheel support, a feed screw, a feed mechanism for advancing and retracting said wheel support relative to said feed screw, manually operable means for actuating said feed mechanism, power means operable between predetermined limits and through said manually operable means to advance and retract said wheel support to grind a workpiece to a predetermined dimension, means to disconnect said power means from said manually operable means for changing the relation between said feed mechanism and said power means to set said feed mechanism for a different dimension, a dimension registering means connected to said manually operable means to register the desired workpiece dimension when said grinding wheel is retracted by said power means, said dimension registering means being adjustable initially to a known dimension and thereafter continuously connected to said manually operable means, and means separate from said manually operable means for rotating said feed screw to actuate said wheel support while maintaining a predetermined relation between said power means and said manually operable means.

2. In a grinding machine, a grinding wheel support movable toward and from a workpiece, a grinding wheel mounted on said wheel support, a feed mechanism for advancing and retracting said wheel support, manually operable means for actuating said feed mechanism, power means operable between predetermined limits and through said manually operable means to advance and retract said wheel support to grind a workpiece to a predetermined dimension, means to disconnect said power means from said manually operable means for changing the relation between said feed mechanism and said power means to set said feed mechanism for a different dimension, and a dimension registering means initially adjustable to register a known dimension when said grinding wheel is retracted by said power means and thereafter continuously connected to said manually operable means.

3. In a grinding machine, a grinding wheel support movable toward and from a workpiece, a grinding wheel mounted on said wheel support, a feed mechanism for advancing and retracting said wheel support, manually operable means for actuating said feed mechanism, power means operable between predetermined limits and through said manually operable means to advance and retract said wheel support to grind a workpiece to a predetermined dimension, means to disconnect said power means from said manually operable means for changing the relation between said feed mechanism and said power means to set said feed mechanism for a different dimension, means connected to said manually operable means to register any selected workpiece dimension within the range of said feed mechanism and initially adjustable with said feed mechanism set for a known dimension, to show said known dimension when said power means is in retracted position and thereafter continuously connected to said manually operable means so long as said grinding wheel remains on the machine.

4. In a grinding machine, a grinding wheel support movable toward and from a workpiece, a grinding wheel mounted on said wheel support, means for supporting said workpiece for rotation about a predetermined axis, a feed mechanism for advancing and retracting said wheel support, manually operable means for actuating said feed mechanism, power means operable between predetermined limits and through said manually operable means to advance and retract said wheel support to grind a workpiece to a predetermined dimension, means to disconnect said power means from said manually operable means for changing the relation between said feed mechanism and said power means to set said feed mechanism for a different dimension, a dressing tool located a predetermined fixed distance from the axis of rotation of a workpiece, said manual means operable while disconnected from said power means to position the grinding wheel in operative relation with said dressing tool, a dimension registering means initially adjustable to show the diameter corresponding to the distance between said dressing tool and said axis of rotation of said workpiece when said grinding wheel is retracted by said power means, and thereafter continuously connected to said manually operable means.

5. In a grinding machine, a grinding wheel support movable toward and from a workpiece, a grinding wheel mounted on said wheel support, a feed mechanism for advancing and retracting said wheel support, manually operable means for actuating said feed mechanism, power means operable between predetermined limits for actuating said feed mechanism to advance and retract said wheel support to grind a workpiece to a predetermined dimension, a dimension registering means initially adjustable to co-act with said manually operable means to set said feed mechanism for a known dimension and to show said known dimension when said power means is in retracted position and thereafter continuously connected to said manually operable means to register any selected workpiece dimension within the range of said feed mechanism.

6. In a grinding machine, a grinding wheel support movable toward and from a workpiece, a grinding wheel mounted on said wheel support, a feed mechanism for advancing and retracting said wheel support, manually operable means for actuating said feed mechanism, power means operable between predetermined limits to advance and retract said wheel support to grind a workpiece to a predetermined dimension, a dimension registering means initially adjustable to co-act with said manually operable means to set said feed mechanism for a known dimension and to show said known dimension when said power means is in retracted position, said dimension registering means being thereafter continuously connected to said manually operable means to register any selected workpiece dimension within the range of said feed mechanism.

7. In a grinding machine, a grinding wheel support movable toward and from a workpiece, a grinding wheel mounted on said wheel support, a feed mechanism for advancing and retracting said wheel support, manually operable means for actuating said feed mechanism, power means operable between predetermined limits to advance and retract said wheel support to grind a workpiece to a predetermined dimension, dimension registering means operable by said manually operable means and initially adjustable to set said feed mechanism for a known dimension and to show said known dimension and thereafter continuously connected to said manually operable means to register successively any workpiece dimension within the range of said feed mechanism.

8. In a grinding machine, a grinding wheel support movable toward and from a workpiece, a grinding wheel mounted on said wheel support, a feed mechanism for advancing and retracting said wheel support, manually operable means for actuating said feed mechanism, power means operable between predetermined limits for actuating said feed mechanism to advance and retract said wheel support in a predetermined zone to grind a workpiece to a predetermined dimension, dimension registering means operable by said manually operable means and initially adjustable to set said feed mechanism for a known dimension and to show said known dimension and thereafter continuously connected to said manually operable means, and means operable independently of said manually operable means to actuate said feed mechanism while retaining the relation between said manually operable means and said dimension registering means.

9. In a grinding machine, a grinding wheel support, a grinding wheel mounted on said wheel support, a feed mechanism for advancing and retracting said wheel support toward and from a workpiece, manual actuating means for said feed mechanism, power means operable through said manual actuating means to advance and retract said wheel support for a grinding operation, said manual actuating means being operable with said power means in advanced position to adjust said wheel support to a position corresponding to a known dimension, a dimension registering means initially adjustable to show the known dimension, means to connect said dimension registering means and said manual actuating means when said power means and said grinding wheel are in retracted position, said dimension registering means and said manual actuating means being continuously connected thereafter so long as said grinding wheel remains on the machine.

10. In a grinding machine, a grinding wheel support, a grinding wheel rotatably mounted on said wheel support, a feed mechanism, power means operable between predetermined limits for actuating said feed mechanism to advance and retract said wheel support, manual actuating means to set said feed mechanism for advance by said power means to a position corresponding to a known dimension, a dimension registering means operable by said manual actuating means and initially adjustable to show said known dimension, said dimension registering means being thereafter continuously connected to said manual actuating means to show when said feed mechanism is set for any selected dimension within the range of said feed mechanism.

11. In a grinding machine, a grinding wheel support, a grinding wheel mounted on said wheel support, a work support, a feed mechanism for advancing and retracting said wheel support relative to said work support, manually operable means for actuating said feed mechanism to position said grinding wheel for a selected work size or dimension, power means operable through said manually operable means to advance said wheel support for a grinding operation, a counter initially adjustable to show said selected work size or dimension, said counter being thereafter continuously connected to said manually operable means to show the position of said grinding wheel in terms of work size for any workpiece dimension within the range of said feed mechanism.

References Cited by the Examiner

UNITED STATES PATENTS

| | | | |
|---|---|---|---|
| 957,936 | 5/10 | Conradson | 51—165.14 |
| 1,473,520 | 11/23 | Rosak | 51—165.14 X |
| 1,911,890 | 5/33 | Fraser. | |
| 2,313,479 | 3/43 | Price et al. | 51—95.1 |
| 2,333,341 | 11/43 | Scrivener. | |
| 2,486,244 | 10/49 | Balsiger et al. | 51—165.03 X |
| 2,520,868 | 8/50 | Whiting | 51—165.07 X |
| 2,933,858 | 4/60 | Glenn et al. | 51—165.01 X |

OTHER REFERENCES

American Machinist, June 29, 1959, pages 90 and 91, Copy in Group 340 and in Library 51—165.21.

LESTER M. SWINGLE, *Primary Examiner.*